US008260101B2

(12) United States Patent
Mathai et al.

(10) Patent No.: US 8,260,101 B2
(45) Date of Patent: Sep. 4, 2012

(54) SYSTEM AND METHOD FOR AN IN-PLANE HOLLOW METAL WAVEGUIDE OPTICAL POWER BEAM SPLITTER

(75) Inventors: Sagi Mathai, Palo Alto, CA (US); Michael Tan, Menlo Park, CA (US); Paul Rosenberg, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 12/263,384

(22) Filed: Oct. 31, 2008

(65) Prior Publication Data

US 2009/0244716 A1 Oct. 1, 2009

Related U.S. Application Data

(60) Provisional application No. 61/040,498, filed on Mar. 28, 2008.

(51) Int. Cl.
*G02B 6/26* (2006.01)

(52) U.S. Cl. ......................................................... 385/44
(58) Field of Classification Search ..................... 385/44
See application file for complete search history.

(56) References Cited

U.S. PATENT DOCUMENTS

| 5,666,448 | A | * | 9/1997 | Schoenwald et al. ........... 385/44 |
| 5,710,854 | A |   | 1/1998 | Myers et al. |
| 5,757,994 | A | * | 5/1998 | Schoenwald et al. ........... 385/44 |
| 2002/0172459 | A1 | | 11/2002 | Bailey et al. |

* cited by examiner

*Primary Examiner* — Uyen Chau N Le
*Assistant Examiner* — Hoang Tran

(57) ABSTRACT

A system and methods for dividing an optical beam in a hollow metallized waveguide are disclosed. The method includes directing an optical signal into a first section of a hollow metallized waveguide. The optical signal is adiabatically expanded in a second section of the hollow metallized waveguide coupled to the first section. The optical signal is split with an in-plane optical beam splitter located in a third section of the hollow metallized waveguide coupled to the second section.

20 Claims, 5 Drawing Sheets

SYSTEM AND METHOD FOR AN IN-PLANE HOLLOW METAL WAVEGUIDE OPTICAL POWER BEAM SPLITTER

CROSS-REFERENCE TO RELATED APPLICATION

The present application claims priority from provisional application Ser. No. 61/040,498, filed Mar. 28, 2008, the contents of which are incorporated herein by reference in their entirety.

BACKGROUND

As computer chip speeds on circuit boards increase to ever faster speeds, a communications bottleneck in inter-chip communication is becoming a larger problem. One likely solution is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven illusive, despite the need for broadband data transfer.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

One method for forming optical interconnects between computer chips on a circuit board is to use optical waveguides formed on the circuit board. Optical waveguides can be superior to fiber optic communications for interconnecting electronics because of the ability to form the waveguides on the circuit board using lithographic or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board. For example, optical waveguide(s) may be formed on a flexible substrate to create a ribbon cable having one or more optical waveguides. The optical waveguides disclosed in this application are formed on substrates using lithographic or similar processes.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, polymer waveguides can have losses that are orders of magnitude greater than the loss in fiber optics.

In addition, typical waveguides are usually manufactured to have dimensions that are roughly proportional with the wavelength of light they are designed to carry. For example, a single mode waveguide configured to carry 1000 nm light may have its largest dimension of 1000 nm to 5000 nm (1 μm to 5 μm). Connecting waveguides of this size can be expensive and challenging. The cost of creating and connecting waveguides has historically reduced their use in most common applications. Multimode waveguides may have larger dimensions on the order of 20-60 μm for the core region. Both single and multimode waveguides have a relatively high numerical aperture (NA) of around 0.2 to 0.3 for a core and clad refractive index contrast of 0.01 to 0.02. The numerical aperture determines the divergence of the beam from the emitting fiber. Thus, a larger NA will result in poor coupling as a function of fiber to fiber separation. Splitting and tapping of the guided optical beams are also difficult to accomplish using these waveguides.

Figure 1:
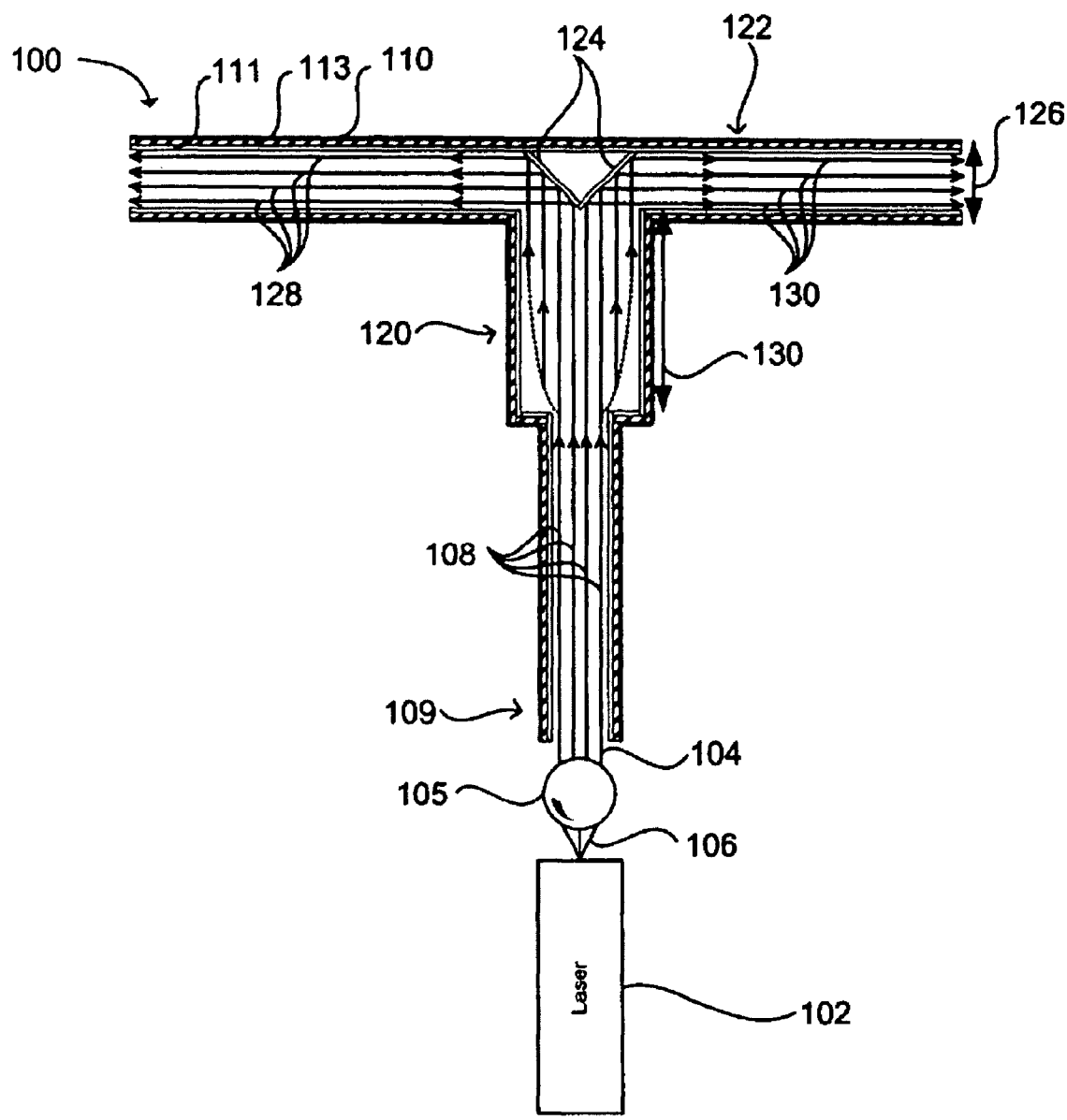
FIG. 1 is an illustration of a system for dividing an optical beam using adiabatic expansion in a hollow metallized waveguide in accordance with an embodiment of the present invention.

A substantial improvement over traditional optical waveguides formed using polymers or dielectric materials is the use of a large core hollow waveguide 109 configured to guide coherent light 104, as shown in FIG. 1. The large core hollow waveguide can have a diameter (or width and/or height) on the order of 50 to 150 or more times a wavelength of the coherent light the waveguide is configured to guide. The large core hollow waveguide can have a cross-sectional shape that is square, rectangular, round, elliptical, or some other shape configured to guide an optical signal. Furthermore, because the waveguide is hollow, the light essentially travels at the speed of light in air or a vacuum.

FIG. 1 illustrates a laser 102 emitting a single mode beam 106 into a waveguide section 109. The single mode beam may bounce between the walls of the waveguide. At each reflection, a substantial loss of the beam may occur. In order to decrease loss within the waveguide, a reflective coating 113 may be added to cover an interior of the waveguide 109, as shown in FIG. 1. The reflective coating can be formed using a plating, sputtering, or similar process, as can be appreciated. If the hollow waveguide comprises a polymer or other material with a low melting point, the reflective coating may be applied using a low temperature process such as sputtering, electroplating or thermal evaporation.

The reflective coating 113 can be comprised of one or more layers of metal, dielectrics, or other materials that are substantially reflective at the wavelength of the coherent light. The metals can be selected based on their reflectivity. A highly reflective layer covering the channel is desired. For example, the reflective layer may be formed using silver, gold, aluminum, or some other metal or alloy that can form the highly reflective layer. Alternatively, the reflective layer may be a dielectric stack which can be formed from one or more layers of dielectric material that is substantially reflective at a selected wavelength. Before the reflective layer is deposited, the uncoated hollow channel may be subject to a heat reflow to smooth out any surface roughness. The reflective layer may also undergo a heat reflow or similar process to smooth surface roughness in the reflective layer that may occur during the deposition process. Electro-polishing may also be used to smooth out the reflective metal surface.

If the hollow metallized waveguide is not hermetically sealed, the reflective coating 113 may oxidize over time. Oxidation of the reflective coating can substantially reduce its reflectivity. To reduce or eliminate degradation of the metal coating's reflectivity, a protective layer 111 can be formed over the reflective coating. The protective layer can comprise a material that is substantially transparent at the wavelength of the coherent light. For example, the protective layer can be formed of silicon dioxide or some other material that can form a substantially air tight bond over the reflective coating. This protective layer will also reduce the propagation loss by further separating the propagating light from the lossy reflective layer.

Hollow waveguides having reflective surfaces operate differently than solid waveguides. Hollow waveguides work using the principle of attenuated total internal reflection guiding light through reflection from the reflective layer(s) and not through total internal reflection between a higher index core region and a lower index cladding region, as typically occurs in solid waveguides such as an optical fiber. The light within the hollow waveguide may be reflected at incident angles less than what is necessary for total internal reflection, as can be appreciated.

For a circular hollow waveguide, the $TE_{01}$ mode has an attenuation per unit length that can be determined according to equation 1:

$$\alpha_c = \frac{R_s}{a\eta} \cdot \frac{\left(\frac{\omega_c}{\omega}\right)^2}{\sqrt{1-\left(\frac{\omega_c}{\omega}\right)^2}}, \quad (1)$$

where a is the waveguide radius, $\omega$ is the frequency of the light in radians, $\omega_c$ is the $TE_0$ cut-off frequency, $\delta$ is the depth of penetration of the light into the metal, $\mu$ is the permeability of the metal, and $\eta$ is the impedance of free space. The attenuation in the hollow waveguide is due to the finite conductivity of the metal walls. $R_s$ is the surface resistivity of the metal and is given by:

$$R_s = \frac{1}{\sigma\delta} = \sqrt{\frac{\pi f \mu}{\sigma}}, \quad (2)$$

where $\sigma$ is the conductivity and f is frequency of light. It can be seen that $R_s$ increases as the square root of f.

From equation (1) above, it can be seen that the attenuation for the $TE_{01}$ mode decreases with increasing frequency. The decrease in attenuation at increasing frequencies occurs because the mode is not coupled to the guide walls at high frequencies. There are also higher order modes which exist in the hollow metal waveguide. However, these modes are very lossy since they are more coupled to the metal walls (i.e. they suffer more reflection due to their higher numerical aperture). At waveguide bends and discontinuities the TE01 mode will be attenuated due to mode conversion to the higher order modes. The lowest loss mode can be described by a set of rays which only graze the reflective wall at a steep angle from the normal resulting in a fewer number of bounces as it propagates down the waveguide. For this reason, the low loss mode has a very small numerical aperture as compared to conventional waveguides.

Ideally, a single mode laser is typically used to direct coherent light into a hollow waveguide. However, single mode lasers can be relatively expensive. It has been discovered that a less expensive, multi-mode laser such as a vertical-cavity surface-emitting laser (VCSEL) can be useful in communicating high data rate signals through relatively short distances using hollow waveguides having reflective inner surfaces. For example, multi-mode lasers can be used to direct high data rate signals through large core hollow reflective waveguides used in inter-chip and inter-circuit board connections. The use of multi-mode lasers can significantly decrease the cost of optical interconnects, enabling their use to interconnect a much wider variety of electronic devices. However, multi-mode laser output can have significantly greater losses when directly coupled to a hollow metal waveguide due to multiple reflections of higher modes which propagate at large angles.

To overcome the attenuation of the higher modes emitted from a multi-mode laser 102, a collimator 105 can be placed within a path of the multi-mode coherent light rays 106 emitted from the laser. The collimator can be a collimating lens or series of lenses. In one embodiment, the collimator can be configured as a ball lens. The ball lens can have an anti-reflective coating.

The collimator 105 is configured to collimate the multi-mode beam to cause a plurality of the multiple modes, or rays 106 emitted from the laser 102 to form a collimated beam 108 in which the multiple modes travel substantially in parallel within the large core hollow waveguide 109. Collimation of the multi-mode beam can be used to efficiently couple the multimode laser to the low loss mode of the hollow metal waveguide by launching rays which are nearly parallel to the waveguide, substantially reducing the number of reflections that occur within the waveguide. Reflections of the collimated beam that do occur within the waveguide will typically be at a relatively shallow angle with respect to the waveguide walls, thus minimizing the number of reflections within the waveguide and therefore reducing the attenuation of the light within the hollow waveguide.

For example, a coherent multimode beam of 850 nm light can be transmitted through a 150 μm large core waveguide having a reflective coating with a loss on the order of 0.07 dB/cm. The numerical aperture of the light exiting the waveguide was determined to be less than 0.05. The losses of the waveguide can scale with its size. Smaller size waveguides have higher losses due to the greater number of internal reflections (bounces) in the waveguide. Thus, larger waveguides may be used to reduce loss.

Significant losses can occur within a waveguide if the optical pathway through the waveguide is not substantially straight. Bends or turns that occur in the waveguide can cause the light to have an unwanted number of bounces, causing a substantial amount of attenuation. To enable optical beams to be routed in a different direction, mirrors, splitters, and lenses can be used.

However, even with the use of highly reflective mirrors (>99.99%), losses can occur within a waveguide due to a change in a radius of the waveguide. This can occur, for example, at a T-junction. As seen in equation (1), attenuation of an optical beam is dependent on the radius (a) of the waveguide. If an optical beam is suddenly redirected into waveguide having a different radius, significant losses of power in the optical beam can occur.

To reduce these losses, it has been found that a second section of metallized hollow waveguide 120 can be added that has a width greater than the width of the first section 109. The term width is intended to indicate a distance across a cross section of the waveguide and is used synonymously with a diameter of a waveguide. The second section can be positioned so that it is coaxial with the first section, thereby allowing the laser light to continue unimpeded from the first section into the second section. Additionally, the second section is located between the first section and a third section 122 used for splitting or redirecting of the collimated beam 108. The width of the second section 120 can be selected to enable adiabatic expansion of the laser light to reduce losses that occur when the laser light is split and redirected in the third section.

In one embodiment, the collimated beam 108 from the first section 109 can be split using an in-plane optical beam splitter 124 located in the third section 122. The in-plane optical beam splitter can be comprised of two mirrors. In one embodiment, the mirrors may be placed at right angles to each other. The mirrors may be constructed of polished metal or stacked dielectric materials. In one embodiment, the mirrors can include the same reflective coating 113 that is used in the metallized waveguide sections 109, 120, 122. It should be appreciated that the mirror profile does not have to be flat as shown in the embodiment, but may take the form of a continuous curved surface.

In one embodiment, the waveguide of the third section can have a width 126 that is substantially equal to a width of the first section 109 of waveguide. The beam splitter can be located within the third section at an output of the second section 120. The beam splitter can be positioned to enable the collimated beam 108 to be split such that a substantially equal amount of power from the collimated beam is redirected in a first direction to form a first split beam 128 and in a second direction to form a second split beam 130. The terms first and second direction are selected arbitrarily without intent to infer a distinction between the directions.

While the width 126 of the third section 122 of waveguide is substantially equal to the width of the first section 109 of waveguide, the act of splitting the collimated beam 108 into the first 128 and second 130 split beams creates two separate beams, each having a width substantially equal to the width of the collimated beam 108. Thus, the width of the combined beams is effectively twice the width of the first section 109. However, the light from the first section cannot expand instantaneously to effectively double its radius in the third section. This can cause mode matching problems that result in a loss of power in each of the light beams in the third section. To minimize these losses, the second section 120 can allow the light to expand adiabatically, as previously discussed.

The second section 120 can have a width that is equivalent to twice the width of the first waveguide (the width of the waveguide in the first and second directions in the third waveguide combined) to allow the collimated beam 108 to expand to the size of the combined waveguides. The length 130 of the second section 120 can be selected to be sufficiently long to allow the collimated beam from the first section 109 to expand to be the size of the combined waveguides. The distance it takes a beam of light to expand to twice its waist radius can be calculated using the Rayleigh length, where the Rayleigh length $z_R$ can be calculated as:

$$z_R = \frac{\pi \omega_0^2}{\lambda},$$

where $\omega_0$ is the radius of the beam at the waist and $\lambda$ is the wavelength of the light. The waist radius is the point where the intensity of the beam drops to a value of $1/e^2$, where e is the base of the natural logarithm. The distance it takes for the waist radius to double is twice the Rayleigh length. Thus, the length of the second section can have a value that is at least $\text{sqrt}(3) \times z_R$.

Setting the length of the second section to be at least $\text{sqrt}(3) \times z_R$ enables the collimated beam 108 from the first section 109 sufficient distance to expand adiabatically such that when the beam is divided using the in-plane optical beam splitter 124 in the third section 122 to form a system 100 for dividing an optical beam using adiabatic expansion in a hollow metallized waveguide with a substantially minimal loss caused by expansion when the beam is redirected in two directions.

For example, using the previous example of a coherent multimode beam with a wavelength of 850 nm that is input into the hollow metallized waveguide section 109 having a diameter of approximately 150 μm, square root of 3 times the Rayleigh length is calculated to be approximately 3.6 centimeters. Thus, the length of the second section for the collimated beam to expand adiabatically to twice its waist radius in this example is 3.6 centimeters. Thus, the length of the second section will need to be substantially longer than the width of the second section (twice the width of the first section 109, or 300 μm).

In some instances, it may not be possible to provide a second section 120 with a sufficient length to provide an adiabatic expansion of the beam to have twice the radius of the collimated beam 108 in the first section 109. For example, there may be limited area on a chip, board, or other substrate on which the hollow metal waveguide is formed. In these instances, the length of the second section can be selected to be as close to square root of 3 times the Rayleigh length as possible to minimize loss when the beam is split in the third section 122.

Figure 2:
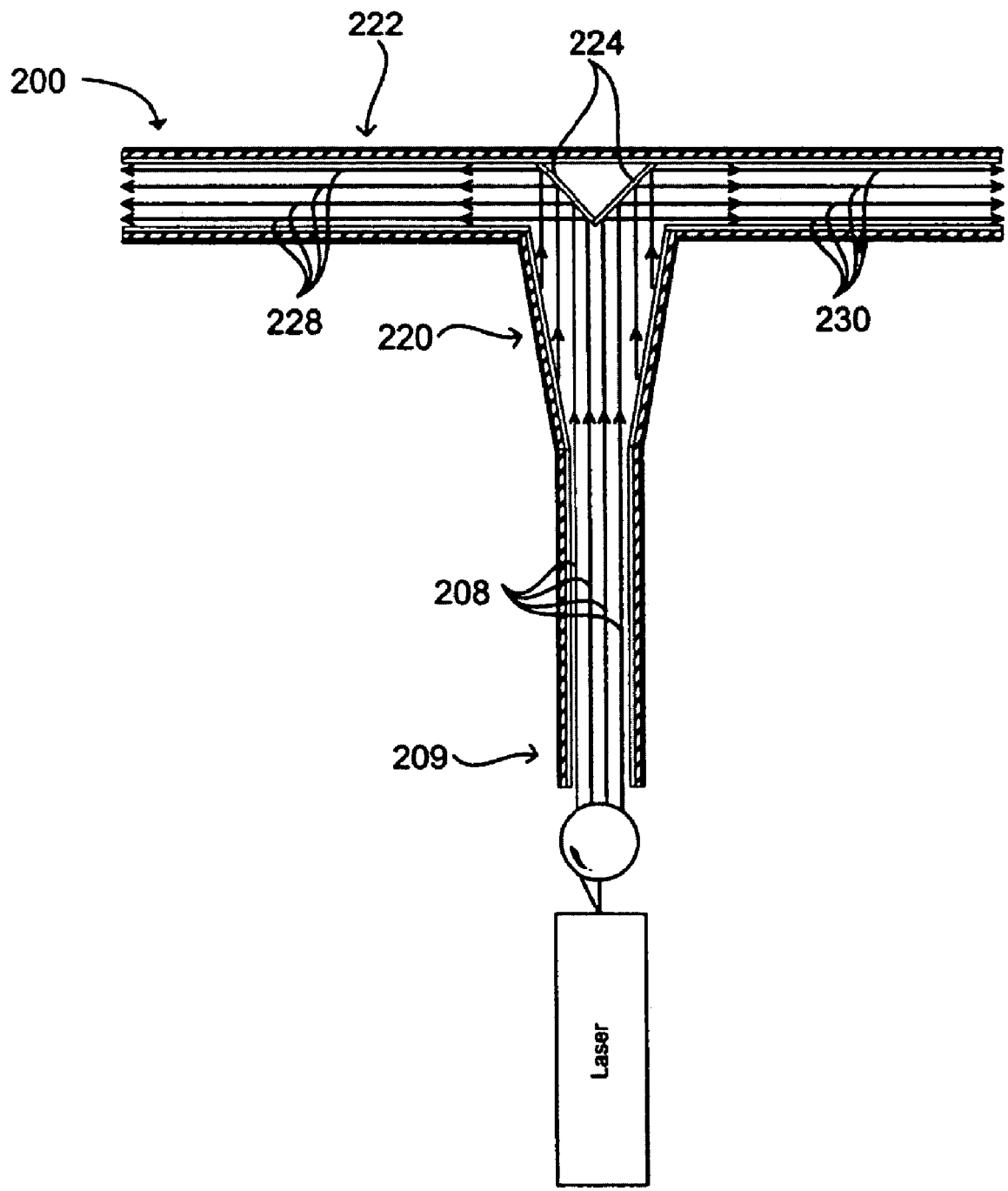
FIG. 2 is an illustration of a system for dividing an optical beam using adiabatic expansion in a hollow metallized waveguide having an increasing width in accordance with an embodiment of the present invention.

Another embodiment showing a system 200 for dividing an optical beam using adiabatic expansion in a metallized hollow waveguide is illustrated in FIG. 2, wherein the collimated beam 208 from the first section 209 of waveguide is directed into a second section 220 of waveguide that is configured to enable the collimated beam from the first section to expand adiabatically. The second section can expand continuously from the first section to the third section to allow for the adiabatic expansion.

While a linear expansion of the second section 220 is illustrated, other rates of expansion, such as a quadratic, exponential, or other mathematical rates of expansion are also considered to be within the scope of the present invention. The rate of expansion can be selected to enable the beam to expand sufficiently to minimize losses when the beam is divided into a first 228 and second 230 split beam using the in-plane optical beam splitter 224 located in the third section 222 of waveguide. The optical beam splitter can be positioned at an output of the second section of waveguide to enable the collimated beam 208 to be divided with the first and second split beams having substantially equal power.

Figure 3:
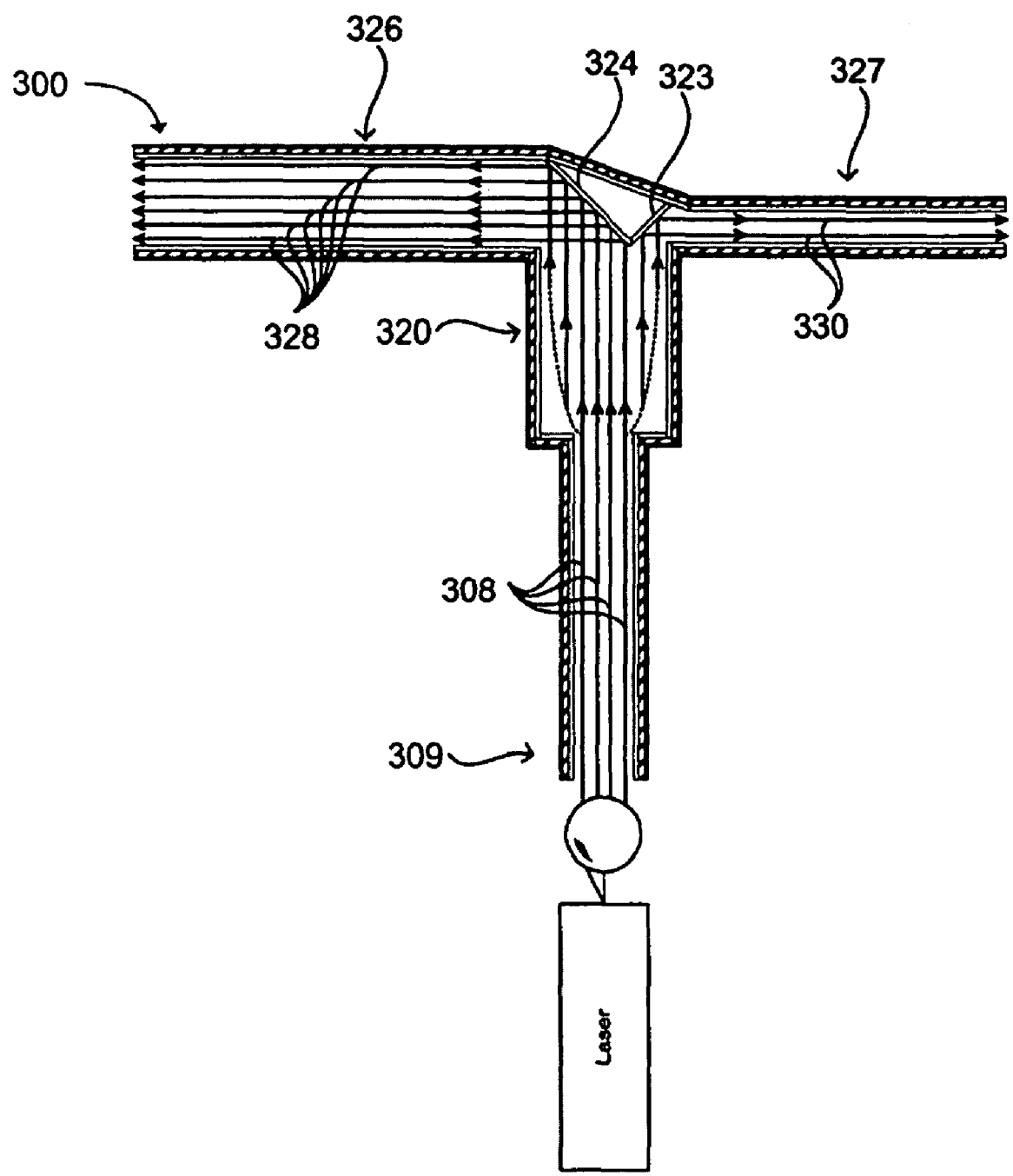
FIG. 3 is an illustration of a system for unequally dividing an optical beam using adiabatic expansion in a hollow metallized waveguide in accordance with an embodiment of the present invention.

Another embodiment showing a system 300 for dividing an optical beam using adiabatic expansion in a metallized hollow waveguide is illustrated in FIG. 3, wherein the power in the collimated beam 308 is divided to provide split beams with differing amounts of power. The collimated beam 308 in a first section 309 of a metallized hollow waveguide can be directed through an adiabatic expansion region in a second section 320 of waveguide that is coaxial with the first section of waveguide, as previously discussed. The second section can be substantially rectangular, as illustrated in FIGS. 1 and 3, or increasing in width at a desired rate, as illustrated in FIG. 2.

The collimated beam 308 from the first section 309 can expand within the second section 320. The beam can then be divided and redirected using an optical beam splitter. The beam splitter illustrated in FIG. 3 is comprised of two mirrors 323 and 324 of unequal size. In one embodiment, the mirrors can be joined at substantially right angles. Alternatively, a different geometry can be selected for the mirrors. The actual angle of the mirrors relative to one another is selected to enable the beam 308 to be redirected in a first direction substantially in the center of a first split section 326 of hollow metallized waveguide and in a second direction substantially in a center of a second split section 327 of hollow metallized waveguide. In one embodiment, the split sections may be set at non-perpendicular angles relative to the first section. This may be done to accommodate a desired layout on a circuit board or other type of substrate on which the system 300 is constructed.

In the embodiment illustrated in FIG. 3, the size and position of each mirror 323, 324 is configured to provide a desired amount of power in each of the split sections 326, 327 after the beam has been split. For example, the embodiment shown in FIG. 3 may split the beam such that a first split beam 328 contains approximately 75% of the power of the collimated beam 308 and a second split beam 330 contains approximately 25% of the power of the collimated beam. The second section can have a width (at the point it is coupled to the third section) that is the combined width of the split sections.

The width of each of the split sections 326, 327 may also be reduced based on the ratio of power that is directed into each section. Reducing the width of the split sections can reduce the amount of real-estate used in a circuit. By keeping the ratio of the output power to width substantially equivalent and directing the beams near the center of the split sections, beam loss can be limited by exciting the lowest order mode. The lowest order mode is the mode with the lowest loss. The lowest order mode can be excited by matching the rays in the collimated beam 308 that bounce off the mirrors 323, 324 to the rays corresponding to the lowest order mode of the waveguide in each of the split sections.

Figure 4:
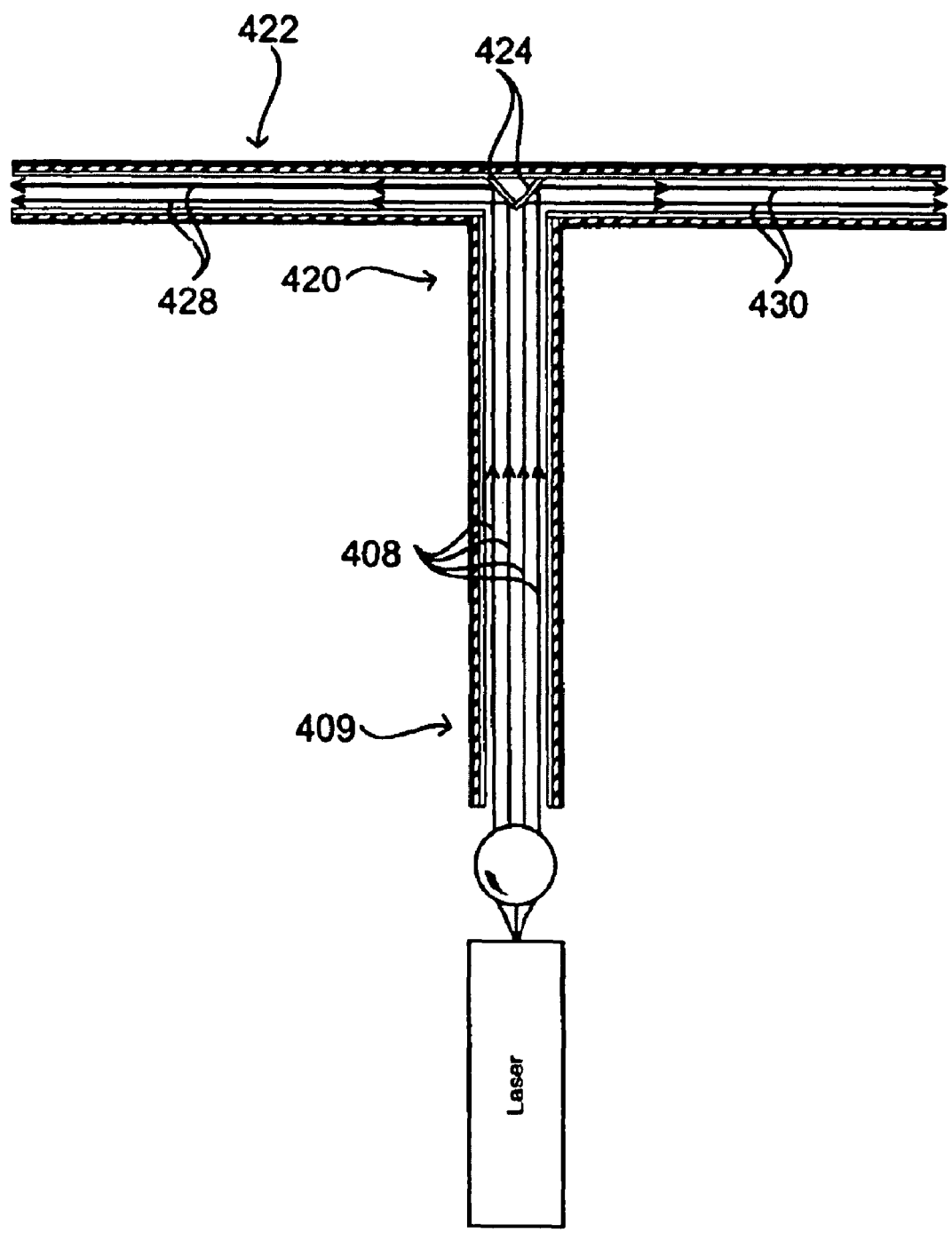
FIG. 4 is an illustration of a system for dividing an optical beam with minimized loss caused by a change in diameter between first and second sections of a hollow metallized waveguide in accordance with an embodiment of the present invention.
Figure 5:
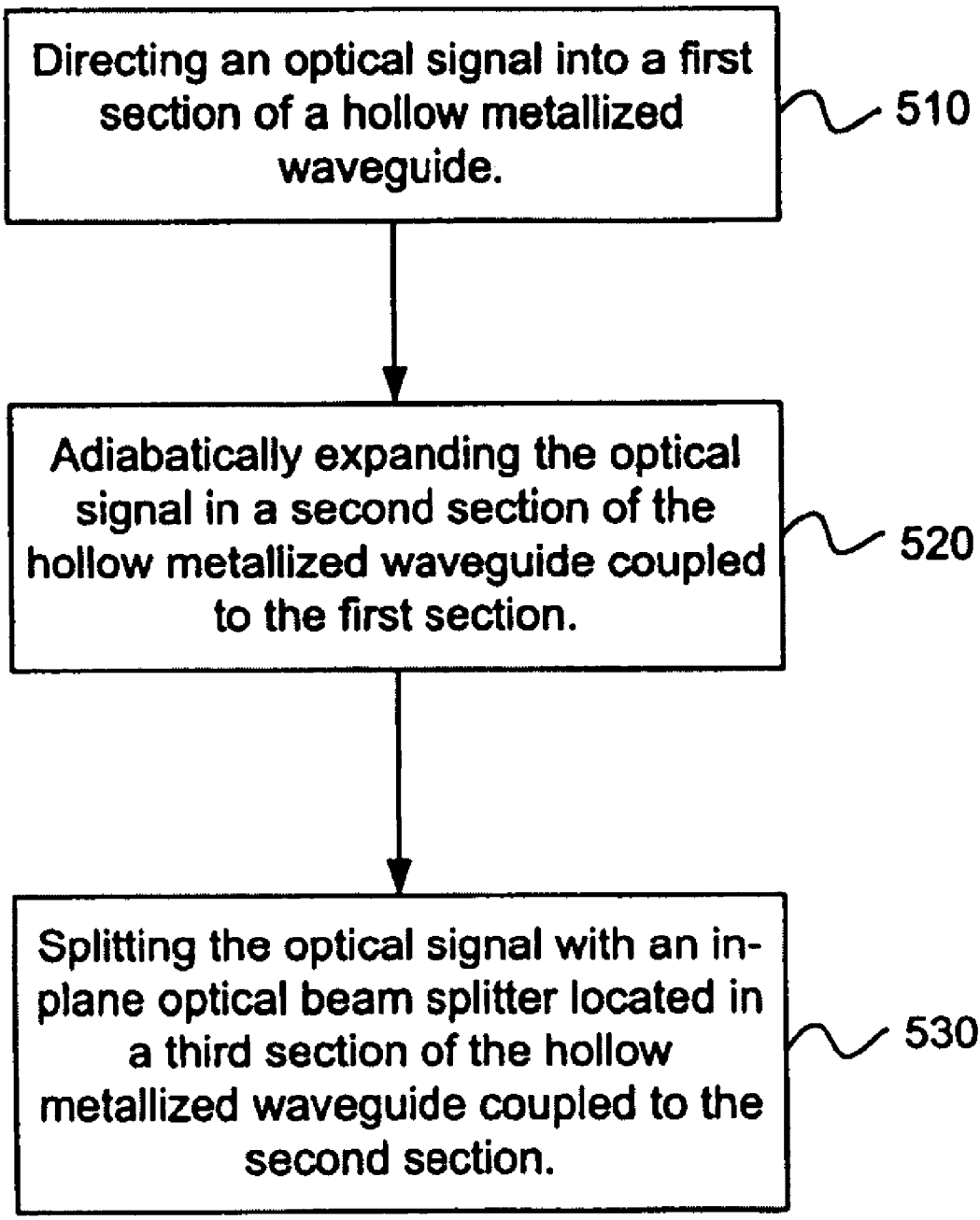
FIG. 5 is a flow chart depicting a method for dividing an optical beam using adiabatic expansion in a hollow metallized waveguide in accordance with an embodiment of the present invention.

In another embodiment, as illustrated in FIG. 4, the first 409 and second 420 sections of hollow metallized waveguide can have substantially equal widths. To limit losses of the collimated optical beam 408 caused by changes in diameter at the optical beam splitter 424, the width of the third section 422 of waveguide can be approximately half the width of the first and second sections of waveguide. This allows the collimated optical beam from the first and second sections to be split into first 428 and second 430 split beams with little to no loss caused by a change in diameter of the waveguides.

In another embodiment, a method 500 for dividing an optical beam in a hollow metallized waveguide is disclosed. The method includes the operation of directing 510 an optical beam into a first section of a hollow metallized waveguide having a first width. The optical beam may be carrying digital information. The beam may be input directly into the first section from a source, such as a laser. Alternatively, the beam may be received from another medium such as a waveguide, optical fiber, or free space transmission.

An additional operation of the method 500 provides for expanding 520 the optical beam adiabatically in a second section of the hollow metallized waveguide. The second section of waveguide can be coaxially coupled to the first section to enable the optical beam to travel between the sections substantially unimpeded. The second section can have a width greater than the width of the first section to enable the optical beam to expand adiabatically. The second section may be rectangular, with a width approximately double the first section. Alternatively, the second section may increase in size between the first section and a third section such that the second section is twice the width of the first section at the location where it couples to the third section.

The shape of the second section can be selected to enable adiabatic expansion of the optical beam from the first section until the radius of the beam is approximately double the radius of the optical beam in the first section. The length of this section can be selected to be as long as possible, preferably equal to or less than square root of 3 times the Rayleigh length, as previously discussed.

Another operation of the method 500 includes splitting 530 the optical beam in a third section of the hollow metallized waveguide. The third section can include an opening coupled to an output of the second section. The beam splitter comprises first and second mirrors positioned relative to the output of the second section to direct a desired amount of power of the optical beam in first and second directions of the third section, respectively.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for dividing an optical beam, comprising:
   a first section of a hollow metallized waveguide having a first width and configured to carry the optical beam;
   a second section of a hollow metallized waveguide having a second width and a length that is at least square root of 3 times a Rayleigh length of the optical beam, the second section being coupled coaxial with the first section, wherein the second width is greater than the first width to enable the optical beam to expand adiabatically;
   a third section of a hollow metallized waveguide having an opening coupled to an output of the second section; and
   an in-plane optical beam splitter located in the third section, wherein the beam splitter comprises a first and a second mirror configured to direct the optical beam in first and second directions in the third section, wherein the first and second minors are positioned relative to the output of the second section to direct a desired amount of power of the optical beam in the first and second directions of the third section respectively.

2. A system as in claim 1, wherein the second width of the second section is substantially twice as wide as the first width of the first section.

3. A system as in claim 1, wherein the second width of the second section expands from the first width to twice the first width at a largest radius over a length of the second section.

4. A system as in claim 1, wherein the beam splitter in the third section is positioned at approximately a center of the second section to enable substantially equal amounts of power to be split in the first and second directions in the third section.

5. A system as in claim 1, wherein the beam splitter in the third section is positioned off-center of the second section to enable unequal amounts of power to be split in the first and second directions in the third section.

6. A system as in claim 1, wherein the third section is positioned substantially perpendicular to the first and second sections.

7. A system as in claim 1, wherein the first and second minors are positioned at approximately right angles relative to one another to enable the optical beam to be directed substantially in a center of the third section of the hollow metallized waveguide.

8. A system as in claim 1, wherein the third section of the hollow metallized waveguide is comprised of two separate sections joined to the second section and set at different angles relative to the second section.

9. A method of dividing an optical beam, comprising:
directing an optical beam into a first section of a hollow metallized waveguide having a first width;
expanding the optical beam in a second section of the hollow metallized waveguide coaxially coupled to the first section, wherein the section has a second width that is approximately double the first width of the first section, and a length that is at least square root of 3 times a Rayleigh length of the optical to enable optical beam to expand adiabatically to have a beam waist radius in the second section that is approximately twice a beam waist radius of the optical beam in the first section;
splitting the optical beam in a third section of the hollow metallized waveguide having an opening coupled to an output of the second section with an in-plane optical beam splitter positioned at the opening, wherein the beam splitter comprises first and second mirrors positioned relative to the output of the second section to direct a desired amount of power of the optical beam in first and second directions in the third section, respectively.

10. A method as in claim 9, wherein expanding the optical beam in the second section further comprises expanding the optical beam in the second section having a length at least square root of 3 times a Rayleigh length of the optical beam in the first section.

11. A method as in claim 9, further comprising expanding a width of the second section from the first width to substantially twice the first width over a length of the second section.

12. A method as in claim 11, further comprising expanding the width of the second section over the length of the second section, wherein the expansion occurs at a rate selected from the group consisting of linearly, quadratically, and exponentially.

13. A method as in claim 9, further comprising positioning the beam splitter about a center of the second section to enable substantially equal amounts of power to be split in the first and second directions in the third section.

14. A method as in claim 9, further comprising positioning the beam splitter off center of the second section to enable different amounts of power to be split in the first and second directions in the third section.

15. A method as in claim 9, further comprising sizing the first and second minors that comprise the beam splitter differently to enable different amounts of power to be split in the first and second directions in the third section.

16. A method as in claim 9, further comprising positioning the first and second minors that comprise the beam splitter at approximately right angles relative to one another to enable the optical beam from the first section to be split and directed substantially in a center of the third section of the hollow metallized waveguide when the third section is perpendicular to the first section.

17. A method as in claim 9, further comprising positioning the first and second minors that comprise the beam splitter at desired angles to enable the optical beam from the first section to be split and directed substantially in a center of a first split section and a second split section of the third section when the first and second split sections are set at different angles relative to the second section.

18. A method of diving an optical beam comprising:
Directing an optical beam from a first section of a hollow metallized waveguide having a first width into a second section of the hollow metallized waveguide having a second width that is approximately half of the first width and a length that is at least square root of 3 times a Rayleigh length of the optical to enable optical beam, wherein the second section is substantially perpendicular to the first section and includes an opening wherein the first section is coupled to the second section of the hollow metallized waveguide; and
Splitting the optical beam in the second section of the hollow metallized waveguide with a beam splitter, wherein the beam splitter comprises first and second mirrors positioned relative to an output of the first section to direct a substantially equal amount of power of the optical beam in first and second directions of the second section, respectively to enable the optical beam to be split with minimal loss caused by a change in diameter of the first and second sections.

19. A system as in claim 1, wherein the second width of the second section of the hollow metalized waveguide is substantially constant along a length of the second section.

20. A method as in claim 18, wherein directing the optical beam comprises directing the optical beam from the first section of a hollow metallized waveguide having a first width that is substantially constant along the length of the first section into the second section of the hollow metallized waveguide having a second width that is approximately half of the first width and is substantially constant along the length of the second section.

* * * * *

UNITED STATES PATENT AND TRADEMARK OFFICE
CERTIFICATE OF CORRECTION

PATENT NO. : 8,260,101 B2
APPLICATION NO. : 12/263384
DATED : September 4, 2012
INVENTOR(S) : Sagi Mathai et al.

It is certified that error appears in the above-identified patent and that said Letters Patent is hereby corrected as shown below:

In column 8, line 64, in Claim 1, delete "minors" and insert -- mirrors --, therefor.

In column 9, line 20, in Claim 7, delete "minors" and insert -- mirrors --, therefor.

In column 10, line 10, in Claim 15, delete "minors" and insert -- mirrors --, therefor.

In column 10, line 15, in Claim 16, delete "minors" and insert -- mirrors --, therefor.

In column 10, line 22, in Claim 17, delete "minors" and insert -- mirrors --, therefor.

In column 10, line 29, in Claim 18, delete "Directing" and insert -- directing --, therefor.

In column 10, line 39, in Claim 18, delete "Splitting" and insert -- splitting --, therefor Signed and Sealed this
Second Day of April, 2013

Teresa Stanek Rea
*Acting Director of the United States Patent and Trademark Office*